(12) United States Patent
Griffin et al.

(10) Patent No.: US 12,143,437 B2
(45) Date of Patent: Nov. 12, 2024

(54) ESTABLISHING A COMMUNICATION CHANNEL BETWEEN COMPUTING NODES WITH DIFFERENT OPERATING SYSTEMS

(71) Applicant: RED HAT, INC., Raleigh, NC (US)

(72) Inventors: Leigh Griffin, Waterford (IE);
Pierre-Yves Chibon, Paris (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/731,654

(22) Filed: Apr. 28, 2022

(65) Prior Publication Data

US 2023/0353630 A1 Nov. 2, 2023

(51) Int. Cl.
*H04L 67/10* (2022.01)
*G06F 8/60* (2018.01)

(52) U.S. Cl.
CPC ............ *H04L 67/10* (2013.01); *G06F 8/60* (2013.01)

(58) Field of Classification Search
CPC ... H04L 67/10; G06F 8/60; G06F 8/63; G06F 9/5072; G06F 9/5077; G06F 9/4856
USPC .......................................................... 709/219
See application file for complete search history.

(56) References Cited

U.S. PATENT DOCUMENTS

| | | | |
|---|---|---|---|
| 7,506,340 B2 | 3/2009 | Gazda et al. | |
| 7,587,722 B2 | 9/2009 | Bendapudi et al. | |
| 9,141,442 B1 | 9/2015 | Voelcker et al. | |
| 9,170,808 B2 * | 10/2015 | Sethi | G06F 8/61 |
| 10,877,739 B1 * | 12/2020 | Fernandez | G06F 9/455 |
| 10,901,966 B2 | 1/2021 | Wang et al. | |
| 2013/0260730 A1 | 10/2013 | Toy et al. | |
| 2016/0321116 A1 | 11/2016 | Schwartz et al. | |
| 2017/0177860 A1 * | 6/2017 | Suarez | G06F 9/45558 |
| 2020/0225968 A1 * | 7/2020 | Ferraro | G06F 9/455 |
| 2020/0272488 A1 * | 8/2020 | Strode, Jr. | H04L 41/0806 |
| 2021/0042160 A1 * | 2/2021 | Alamouti | G06F 9/5011 |
| 2022/0075671 A1 * | 3/2022 | Talukdar | G06F 11/2028 |

OTHER PUBLICATIONS

Saeki, et al., "A Robust and Flexible Operating System Compatibility Architecture," VEE'20, Mar. 17, 2020, pp. 1-14.

* cited by examiner

*Primary Examiner* — Suraj M Joshi
*Assistant Examiner* — Ayele F Woldemariam

(57) ABSTRACT

A system can receive a request for establishing a communication channel between a first node executing a first operating system and a second node executing a second operating system, the second operating system being different from the first operating system. The system can obtain specification data configured for deploying a container that includes the first operating system and communication software. The system can, in response to receiving the request, transmit the specification data to the second node. The second node can deploy the container with the first operating system and the communication software based on the specification data. The communication software can establish the communication channel between a first instance of the first operating system executing on the first node and a second instance of the first operating system executing in the container.

20 Claims, 4 Drawing Sheets

ESTABLISHING A COMMUNICATION CHANNEL BETWEEN COMPUTING NODES WITH DIFFERENT OPERATING SYSTEMS

TECHNICAL FIELD

The present disclosure relates generally to operating systems run on containers. More specifically, but not by way of limitation, this disclosure relates to establishing a communication channel between computing nodes with different operating systems.

BACKGROUND

A distributed computing environment may include several nodes (e.g., physical machines) that may be physically separate but communicatively coupled to one another via a network, such as a local area network or the Internet. The nodes may be executing the same operating system or different operating systems to one another.

DETAILED DESCRIPTION

Figure 1:
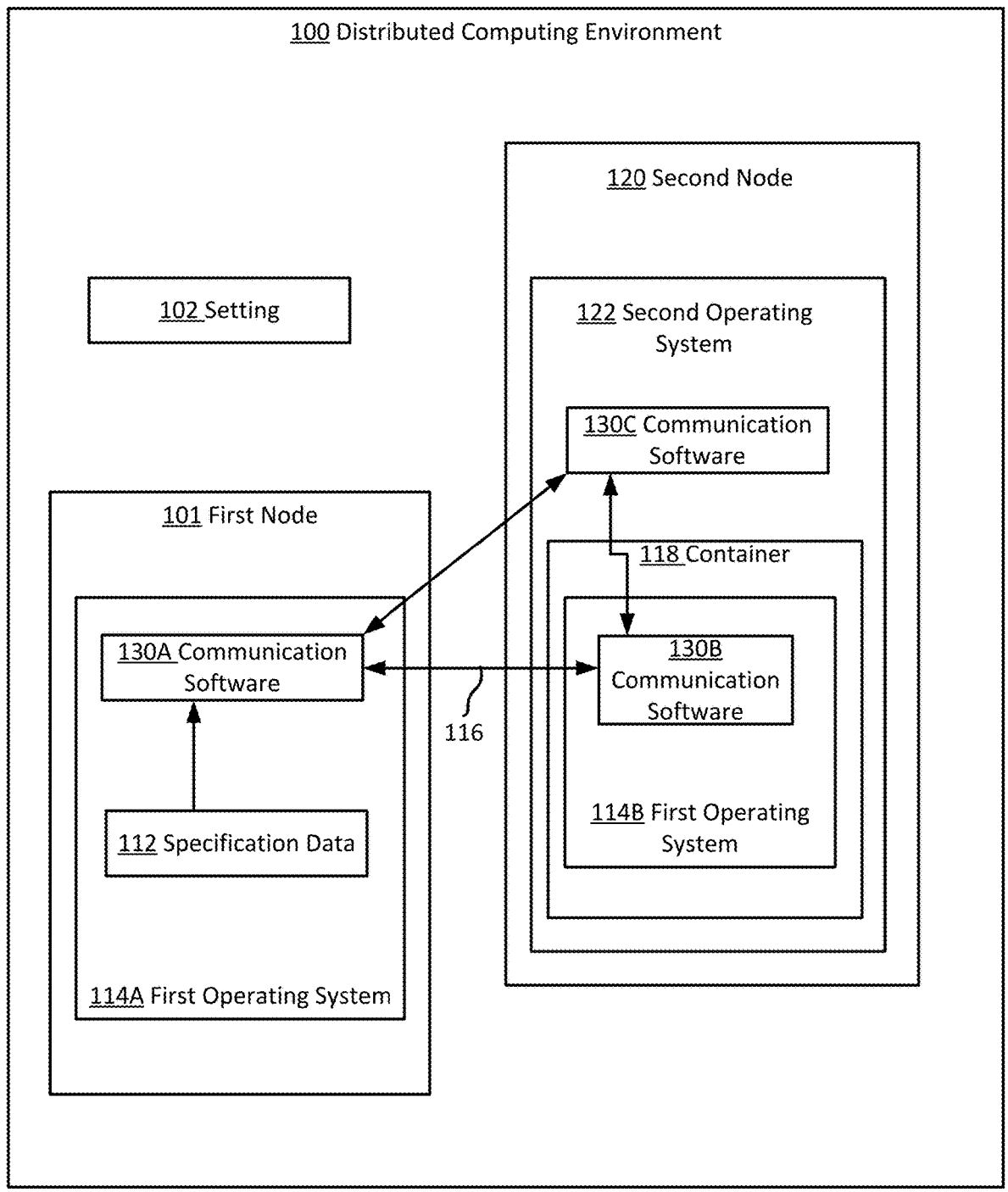
FIG. 1 is a block diagram of an example of a system for establishing a communication channel between computing nodes with different operating systems according to some aspects of the present disclosure.

A distributed computing environment may include a first node running a first operating system and a second node running a second operating system. In some situations, the first operating system and the second operating system may be unable to communicate with one another or have limited communication capabilities. The reason for these communication limits may be that network hardware (e.g., a firewall or hub), a security protocol, or another aspect of the distributed computing environment has been intentionally or unintentionally configured in a way that limits such communications. For example, a network administrator may have configured a firewall to filter data packets on a particular port for security reasons. But unbeknownst to the network administrator, one or both of the operating systems may commonly communicate using that port, so such filtering may significantly impact communications between the two operating systems. These communication limits may raise various interoperability problems. For example, the two operating systems may be unable to engage in point-to-point communication, which can impact how the two operating systems interact with one another. As another example, the two operating systems may be unable to share certain files or software. As still another example, the two operating systems may be unable perform certain computing operations that involve communication between the two operating systems, such as computational tasks that required shared data.

Some examples of the present disclosure can overcome one or more of the abovementioned problems by instantiating a container on a first node running a first operating system, where the container includes a second operating system and communications software for establishing a communication channel with a second node that is also running the second operating system. This allows the first node to communicate with the second node (via the container), for example in situations where the first operating system and the second operating system may otherwise have limited communication capabilities.

For example, a distributed computing environment may include a first node with a first operating system and a second node with a second operating system, where the second operating system is different from the first operating system. The two nodes may be limited in their communication capabilities at least partially because of their different operating systems. To help resolve this issue, in some examples the first node and the second node may each include their own instances of communication software. The first node can use its communication software to transmit specification data, such as a specification file, to the communication software on the second node. The specification data may be relatively small in size, and communication software may allow the first node to transmit this limited amount of data to the second node relatively unencumbered.

Upon receiving the specification data, the second node can use the specification to deploy a container on thereon. The container can include the first operating system and its own instance of the communication software. The container's instance of the communication software may then establish a communication channel (e.g., a point-to-point communication channel) back to the communication software running on the first node. Because the container and the first node are running the same operating system, communications between the two may not be limited at all, or to the same degree, that communications between the first operating system and the second operating system may be limited. The instances of the communication software may be able to bi-directionally communicate with one another using a pre-defined protocol, which may be absent from the second operating system. As a result, the first node and the second node may be able to communicate more freely using the communication channel than may otherwise be possible.

In some examples, the specification data can be configured for use with a container lifecycle manager, such as the container lifecycle manager in Kubernetes. Kubernetes is an open-source container orchestration platform for automating deployment, management, and scaling of containerized applications. The container lifecycle manager can ingest the specification data and responsively deploy a container with the configuration defined in the specification data. The specification data includes settings that are to be applied to corresponding containers.

In some examples, the first node may generate the specification data based on its own operating system's configuration. This may allow the container's operating system can better parallel that of the first node. Alternatively, the specification data may be predefined. The first node may download the specification data from a repository or another device.

In some examples, the container may allow software packages for the first operating system to run natively on second node without translating the software packages. The container may also allow a workload on the first node to be shifted to the second node. A workload may include one or more processes running on the first operating system that cannot run on the second operating system without being translated to a format compatible with the second operating system. The one or more processes running on the first operating system on the first node may be transmitted to the second node via the communications channel, whereby the one or more processes may be migrated to the container. Migrating the one or more processes to the container can enable the first operating system of the container to continue executing the one or more processes of the workload.

Some aspects of the present disclosure may allow the distributed computing environment to enact more stringent firewall rules and security protocols to restrict communication among the first operating system and the second operating system. Such security protocols may be desirable because they can prevent a malicious entity from initiating communications between the first operating system and the second operating system. Similarly, stringent firewall rules may prevent undesired network traffic to and from the distributed computing environment. But despite these advantages, conventionally these rules are often not implemented (e.g., at a global level) because they can be undesirably prohibitive and raise operability issues, for example when it is necessary to have some level of communication between the two operating systems. Some examples described herein can strike an appropriate balance between security and operability by allowing for selective exceptions to be made to those rules using the container technique.

Shifting the workload from one node to another using techniques described herein can also can improve operation of the computing system, for example by preventing computing resource-related bottlenecks. This may be achieved by shifting resource-heavy processes from a first node with few computing resources to a second node with many computing resources. Preventing computing resource-related bottlenecks by shifting workloads among nodes can provide the distributed computing environment with elasticity, and can improve the efficiency of processes or services being run by nodes of the distributed computing environment. In some examples, the container can be scaled to consume a required amount of computing resources for the processes or services being run on the container.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for establishing a communication channel between computing nodes with different operating systems according to some aspects of the present disclosure. In this example, the system includes a distributed computing environment 100 with a first node 101 and a second node 120. Other examples may involve more nodes, such as dozens or hundreds of nodes. The distributed computing environment 100 can include a computing cluster, a cloud computing environment, a data grid, or any combination of these.

The first node 101 may be running first operating system 114A, which may serve as a host operating system for the first node 101. The second node 120 may be running a second operating system 122, which may serve as a host operating system for the second node 120. Examples of the operating systems can include Windows®, Red Hat Enterprise Linux®, Ubuntu®, etc. In some examples, the first node 101 may have a different computer architecture than the second node 120. For example, the first node 101 may have an x86 architecture and the second node 120 may have an aarch64 architecture.

The distributed computing environment 100 may include a setting 102 that prevents or limits the capability of the first operating system 114A to communicate with the second operating system 122. In some examples, the setting 102 may be a configuration of a firewall or other network component, such as a router or hub. Additionally or alternatively, the setting 102 may include a security protocol or restriction applied by a system administrator or another user. In some cases, communications between the first operating system 114A and the second operating system 122 may be limited for other reasons, such as incompatibilities with their network stacks or communication protocols.

To help facilitate communications between the two nodes 101, 120, the first node 101 may run a first instance of communication software 130A on the first operating system 114A and the second node 120 may run a second instance of the communication software 130C on the second operating system 122. Communication software 130A may be able to communication with communication software 130C using ports or protocols that may be different from how the underlying operating systems 114A, 122 communicate. This may allow the first node 101 to transmit limited data to the second node 120, and vice-versa. For example, the first node 101 may obtain and transmit specification data 112 to the second node 120. The first node 101 can transmit the specification data 112 using its communication software 130A. The specification data can be received at the second node 120 by its communication software 130C. The specification data 112 may include a configuration data for a container that is to be deployed using the specification data 112.

The second operating system 122 may use the specification data 112 to instantiate a container 118 on the second node 120. The container 118 may include a second instance of the first operating system 114B and a third instance of the communication software 130B. The communication software 130B can allow the container 118 to establish communications with the first instance of the first operating system 114A executing on the first node 101 and the second operating system 122 executing on the second node 120.

For example, the communication software 130B within the container 118 can establish a communication channel 116 with the communication software 130A on the first node 101. The communication channel 116 may be different from other communications channels and protocols that the first operating system 114A of the first node 101 may use to communicate with the second operating system 122 of the second node 120. The communication channel 116 may also be different from other communication channels and protocols that the communication software 130A on the first node 101 may use to communicate with the communication software 130C running on the second operating system 122 of the second node 120. As a result, the two nodes 101, 120 can communicate more freely than may otherwise be possible absent the communication channel 116. Some examples may also allow for more stringent firewall rules and security protocols to be applied in the distributed computing environment 100, and can allow for workloads to be shifted from the first node 101 to the second node 120.

Figure 2:
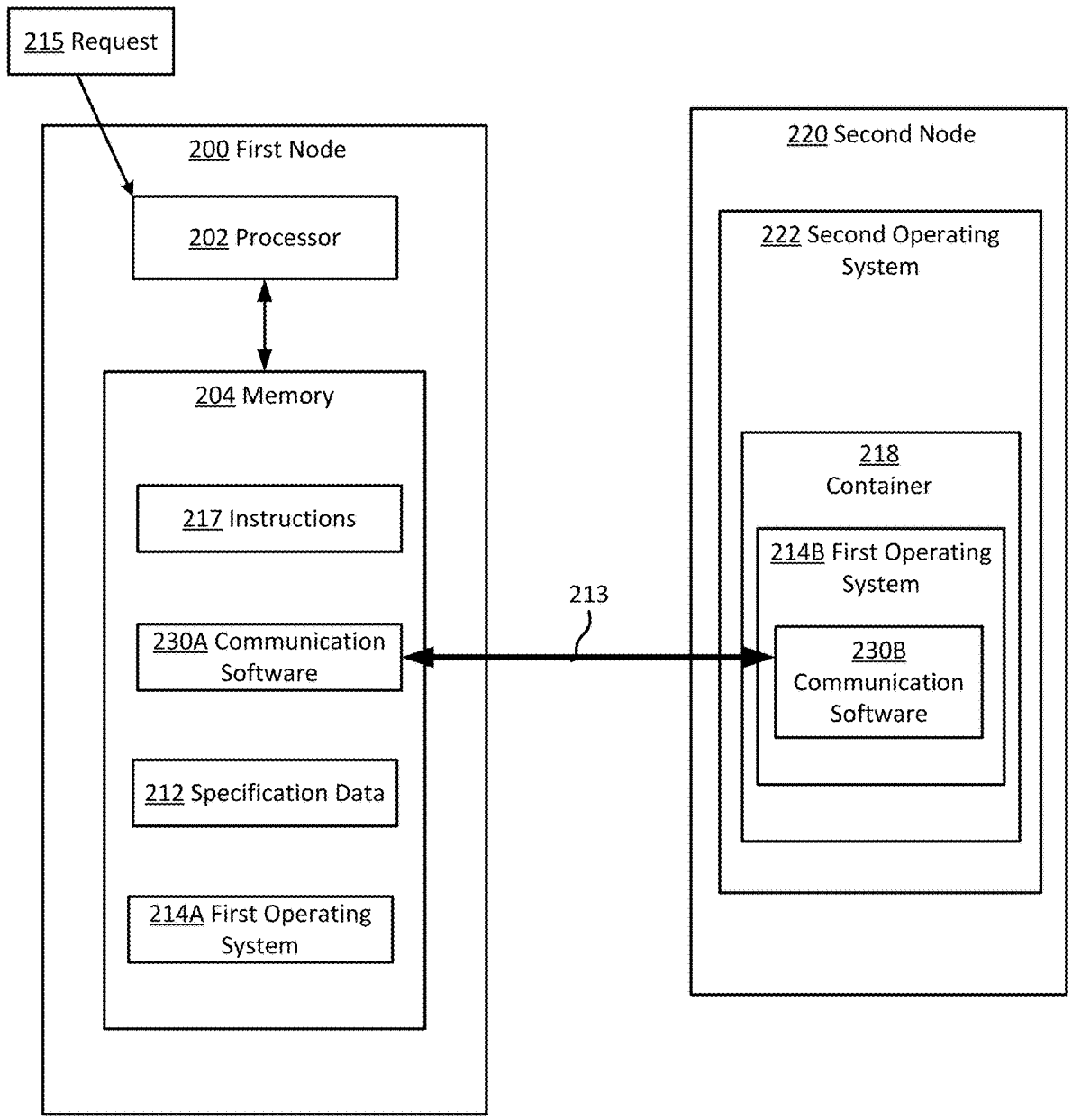
FIG. 2 is a block diagram of another example of a system for establishing a communication channel between computing nodes with different operating systems according to some aspects of the present disclosure.

FIG. 2 is a block diagram of another example of a system for establishing a communication channel between computing nodes with different operating systems according to some aspects of the present disclosure. A first node 200 may include a processor 202 that is communicatively coupled to a memory 204. The processor 202 and memory 204 may be integrated into a single housing or may be distributed from one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 217 stored in the memory 204 to perform one or more operations. In some examples, the instructions 217 can include processor-specific instructions generated by a compiler or an interpreter from code written in any suitable computer-programming language, such as C, C++, C#, etc.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 202 with the instructions 217 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 217.

The first node 200 and a second node 220 may be part of a distributed computing environment, such as a computing cluster, a cloud computing system, or a data grid. The first node 200 may be running an instance of first operating system 214A and may include a first instance of a communication software 230A. The second node 220 may be running a second operating system 122. The second operating system 122 can be different from the first operating system 214A. The distributed computing environment may include a setting configured to prevent or limit communications between the first operating system 214A and the second operating system 222. In some examples, the setting may be a configuration of a firewall, a router, a network hub or switch, or other networking hardware or software.

In some examples, the processor 202 can receive a request 215. The request 215 may be for initiating a process to establish a communication channel 213 between the first node 200 and the second node 220. In response to receiving the request 215, the processor 202 may obtain and transmit specification data 212 to the second node 220. The specification data 212 may include a configuration file.

The second operating system 222 may receive the specification data 212 and use it to deploy a container 218. The container 218 may include a second instance of the first operating system 214B and a second instance of the communication software 130B. Once running, the communication software 230A, 230B can establish the communication channel 213, which may be subsequently used to transmit data between the two nodes 200, 220. The communication channel 213 may involve a certain network port or a logical port, a certain series of hops, and/or another communication mechanism to facilitate data communications. The communications channel 213 may be used by the processor 202 for communicatively coupling the first instance of the first operating system 214A and the second operating system 222. The communications channel 213 can allow the two nodes 200, 220 to more easily communicate with one another than may otherwise be possible between the first operating system 214A and the second operating system 222.

Figure 3:
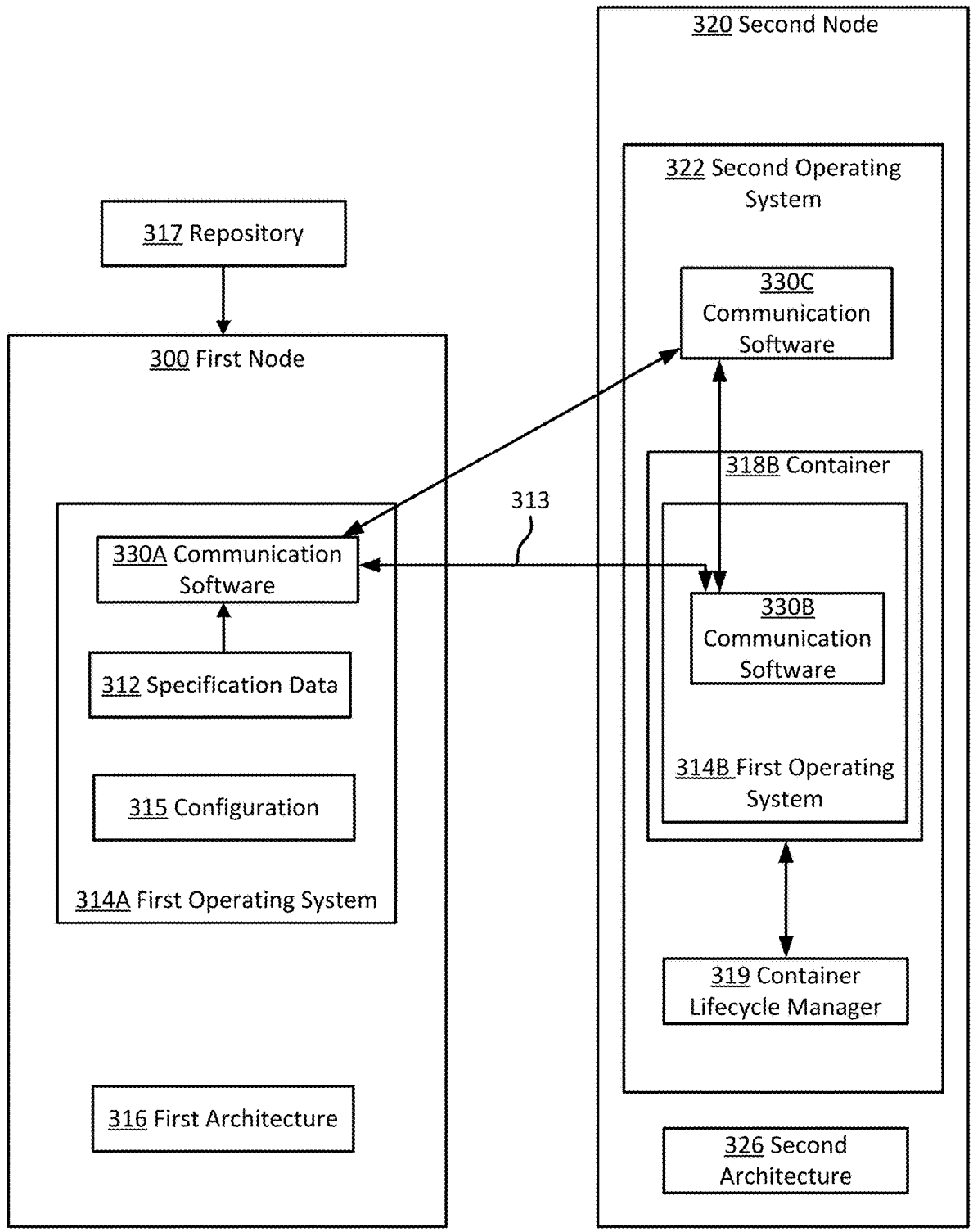
FIG. 3 is a block diagram of a further example of a system for establishing a communication channel between computing nodes with different operating systems according to some aspects of the present disclosure.

FIG. 3 is a block diagram of a further example of a system for establishing a communication channel between computing nodes with different operating systems according to some aspects of the present disclosure. A first node 300 may include a first computer architecture 316, and a second node 320 may include a second computer architecture 326 that is different from the first computer architecture 316. The first node 300 and the second node 320 may be part of a distributed computing environment.

The first node 300 may be running an instance of first operating system 314A and may include a first instance of a communication software 330A. The second node 320 may be running a second operating system 322 and may include a second instance of a communication software 330C. The distributed computing environment may be configured to prevent or limit communications between the first operating system 314A and the second operating system 322. Additionally or alternatively, the distributed computing environment may be configured to prevent or limit communications between the first computer architecture 316 and the second computer architecture 326.

In some examples, the first node 300 may retrieve specification data 312 from a repository 317. Alternatively, the first node 300 may generate the specification data 312. The specification data 312 may include parameters related to a configuration 315 of the first operating system 314A. The configuration 315 of the first operating system 314A may include runtime variables, metadata, or any other suitable information related to a state of the first operating system 314A. The specification data 312 may include a YAML file, a JSON file, or any other suitable text file. The specification data 312 may be generated by issuing a command to retrieve the parameters from the first operating system 314A. Having obtained the specification data 312, the first node 300 can transmit the specification data 312 (e.g., via its communication software 330A) to the second node 320 (e.g., via its communication software 330C).

The second operating system 322 may use the specification data 312 to instantiate a container 318 on the second node 320. The specification data 312 may be used by a container lifecycle manager 319 running on the second node 320 (e.g., running on the second operating system 322) or elsewhere in the system for configuring the container 318B. The container 318 may include a second instance of the first operating system 314B and a third instance of the communication software 330B. The communication software 330B may be used for establishing communications with the first instance of the first operating system 314A and the second operating system.

Figure 4:
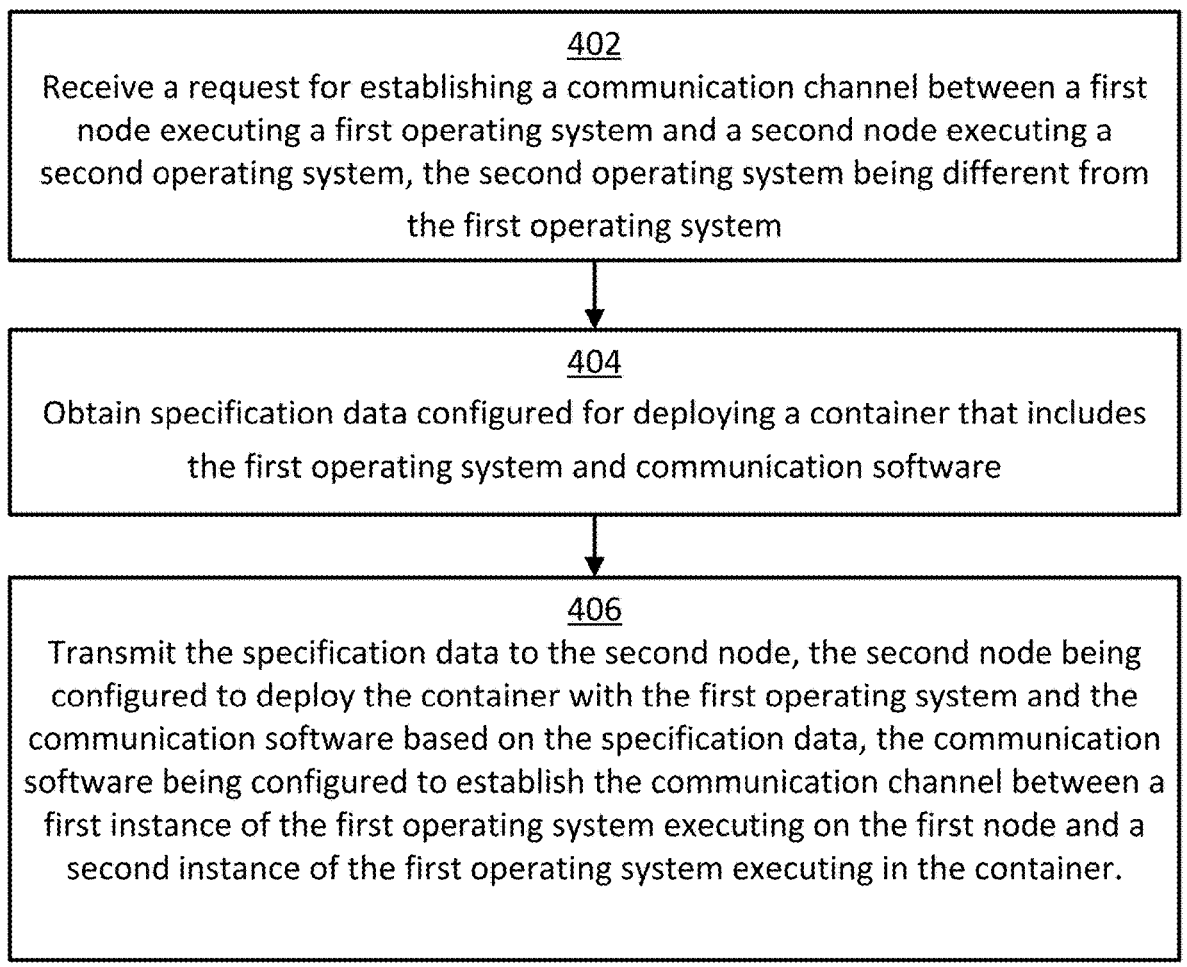
FIG. 4 is a method flowchart of a for establishing a communication channel between computing nodes with different operating systems according to some aspects of the present disclosure.

FIG. 4 is a method flowchart of a process for establishing a communication channel between computing nodes with different operating systems according to some aspects of the present disclosure. Other examples may include more operations, fewer operations, different operations, or a different order of the operations shown in FIG. 4. The operations of FIG. 4 are described below with reference to the components of FIG. 2 described above.

At block 402, a processor 202 receives a request 215 for establishing a communication channel 213 between a first node 200 executing a first operating system 214 and a second node executing a second operating system 222, the second operating system 222 being different from the first operating system 214A. The first node 200 may include a first architecture, and the second node 220 may include a second architecture. The first operating system 214A may be unable to establish point-to-point communications with the second operating system 222 or may otherwise have limited communication with the second operating system 222.

At block 404, the processor 202 obtains specification data 212 configured for deploying a container 218, where the container 218 includes the first operating system 214B and communication software 230A. The specification data 212 may be retrieved by the processor 202 from a repository, or any other suitable storage method. The specification data 212 may be used by a container lifecycle manager running on the second node 220 to determine parameters related to the container 218 during or prior to runtime.

At block 406, the processor 202 transmits the specification data 212 to the second node 220, the second node being configured to deploy the container with the first operating system 214B and the communication software 230B based on the specification data 212. The communication software 230A-B can establish the communication channel 213 between a first instance of the first operating system 214A executing on the first node 200 and a second instance of the first operating system 214B executing in the container 218. The communication channel 213 may be a point-to-point communication channel or any other suitable type of communication channel 213.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising instructions executable by a processor for causing the processor to:
   receive a request for establishing a communication channel between a first node executing a first operating system and a second node executing a second operating system that is different from the first operating system;
   obtain specification data configured for deploying a container that includes the first operating system and communication software; and
   in response to receiving the request, transmit the specification data to the second node that is configured to deploy the container with the first operating system and the communication software based on the specification data, the communication software being configured to establish the communication channel between a first instance of the first operating system executing on the first node and a second instance of the first operating system executing in the container,
   wherein the second instance of the first operating system executing in the container is configured to communicate with the second operating system executing on the second node.

2. The non-transitory computer-readable medium of claim 1, further comprising instructions that are executable by the processor for causing the processor to obtain the specification data by retrieving the specification data from a repository.

3. The non-transitory computer-readable medium of claim 1, wherein the first node includes a first system architecture and the second node includes a second system architecture that is different from the first system architecture.

4. The non-transitory computer-readable medium of claim 1, further comprising instructions executable by the processor for causing the processor to generate the specification data based on a configuration of the first operating system on the first node.

5. The non-transitory computer-readable medium of claim 1, wherein the specification data is stored in a file and includes parameters that are configured to control a lifecycle of the container, and further comprising instructions that is executable by the processor for causing the processor to transmit the specification data to the second node by transmitting the file containing the specification data to the second node.

6. The non-transitory computer-readable medium of claim 1, wherein the first node and the second node are positioned within a distributed computing environment having a setting configured to prevent the first operating system from communicating with the second operating system.

7. The non-transitory computer-readable medium of claim 1, wherein the communication channel is a point-to-point communication channel.

8. A method comprising:
   receiving, by a processor, a request for establishing a communication channel between a first node executing a first operating system and a second node executing a second operating system, the second operating system being different from the first operating system;
   obtaining, by the processor, specification data configured for deploying a container that includes the first operating system and communication software; and
   in response to receiving the request, transmitting, by the processor, the specification data to the second node, the second node being configured to deploy the container with the first operating system and the communication software based on the specification data, the communication software being configured to establish the communication channel between a first instance of the first operating system executing on the first node and a second instance of the first operating system executing in the container,
   wherein the second instance of the first operating system executing in the container is configured to communicate with the second operating system executing on the second node.

9. The method of claim 8, further comprising obtaining the specification data by retrieving the specification data from a repository.

10. The method of claim 8, wherein the first node includes a first system architecture and the second node includes a second system architecture that is different from the first system architecture.

11. The method of claim 8, further comprising generating the specification data based on a configuration of the first operating system on the first node.

12. The method of claim 8, wherein the specification data is stored in a file and includes parameters configured to control a lifecycle of the container, and further comprising transmitting the specification data to the second node by transmitting the file containing the specification data to the second node.

13. The method of claim 8, wherein the first node and the second node are positioned within a distributed computing environment that includes a hardware device configured to prevent the first operating system from communicating with the second operating system.

14. The method of claim 8, wherein the communication channel is a point-to-point communication channel.

15. A system comprising:
a processor; and
a memory including instructions executable by the processor for causing the processor to:
    receive a request for establishing a communication channel between a first node executing a first operating system and a second node executing a second operating system, the second operating system being different from the first operating system;
    obtain specification data configured for deploying a container that includes the first operating system and communication software; and
    in response to receiving the request, transmit the specification data to the second node, the second node being configured to deploy the container with the first operating system and the communication software based on the specification data, the communication software being configured to establish the communication channel between a first instance of the first operating system executing on the first node and a second instance of the first operating system executing in the container,
    wherein the second instance of the first operating system executing in the container is configured to communicate with the second operating system executing on the second node.

16. The system of claim 15, wherein the instructions are further executable by the processor for causing the processor to retrieve the specification data from a repository.

17. The system of claim 15, wherein the first node includes a first system architecture and the second node includes a second system architecture that is different from the first system architecture.

18. The system of claim 15, wherein the instructions are further executable by the processor for causing the processor to generate the specification data based on a configuration of the first operating system on the first node.

19. The system of claim 15, wherein:
the processor and the memory are parts of the first node;
the first instance of the first operating system includes a first instance of the communication software;
the second instance of the first operating system includes a second instance of the communication software;
the communication channel is between the first instance of the communication software and the second instance of the communication software; and
the first instance of the communication software and the second instance of the communication software are configured to bi-directionally communicate with one another using a predefined protocol that is absent from the second operating system.

20. The system of claim 15, wherein the first node and the second node are positioned within a distributed computing environment that includes a setting or a hardware device configured to prevent the first operating system from communicating with the second operating system.

* * * * *